United States Patent [19]
Pfister et al.

[11] 3,818,040
[45] June 18, 1974

[54] ALKENYL AND ALKYNYL SUBSTITUTED XANTHONE CARBOXYLIC ACID COMPOUNDS

[75] Inventors: Jurg R. Pfister, Los Altos; Ian T. Harrison; John H. Fried, both of Palo Alto, all of Calif.

[73] Assignee: Syntex Corporation, Apartodo, Panama

[22] Filed: Sept. 25, 1972

[21] Appl. No.: 291,618

[52] U.S. Cl. ................................ 260/335, 424/283
[51] Int. Cl. ............................................. C07d 7/44
[58] Field of Search .................................... 260/335

[56] References Cited
UNITED STATES PATENTS
3,706,768  12/1972  Bays ................................... 260/335

Primary Examiner—Norma S. Milestone
Attorney, Agent, or Firm—Evelyn K. Merker, Walter H. Dreger.

[57] ABSTRACT

Compositions containing and methods employing, as the essential ingredient(s), novel alkenyl and alkynyl substituted xanthone carboxylic acid compounds which are useful in the treatment of allergic conditions. Methods for preparing these compounds and compositions and intermediates therein are also disclosed. 7-Vinylxanthone-2-carboxylic acid and 5-ethynylxanthone-2-carboxylic acid are illustrated as representative of the class.

14 Claims, No Drawings

ALKENYL AND ALKYNYL SUBSTITUTED XANTHONE CARBOXYLIC ACID COMPOUNDS

The present invention is directed to novel alkenyl and alkynyl substituted xanthone carboxylic acid compounds and to compositions containing and methods utilizing these compounds as the essential ingredient in the treatment of conditions associated with allergic manifestations, for example, asthmatic conditions.

In a first aspect, the present invention relates to C-5, 6, and 7 alkenyl and alkynyl substituted xanthone carboxylic acid compounds selected from thos represented by the following formulas:

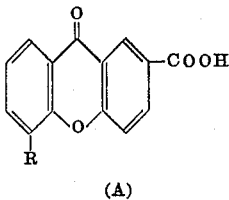

(A)

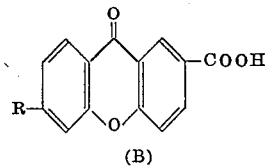 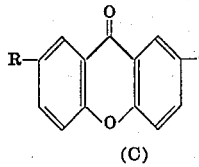

(B)          (C)

and the pharmaceutically acceptable, non-toxic esters, amides and salts thereof, wherein each R is a group selected from those of the formulas:

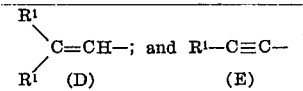

in which each $R^1$ is hydrogen, methyl or ethyl.

Thus included within the scope of the present invention are the C-5(Formula A), C-6(Formula B), or C-7(Formula C) substituted xanthone-2-carboxylic acid compounds and the pharmaceutically acceptable, non-toxic esters, amides, and salts thereof, wherein the substituent is selected from an alkenyl (e.g., vinyl) group of Formula (D) above, and from an alkynyl (e.g., ethynyl) group of Formula (E) above, the optionally methyl, ethyl ($R^1$) substituted derivatives thereof.

In a second aspect, the present invention is directed to a method useful for relieving symptoms associated with allergic manifestations, such as are brought about by antigen-antibody (allergic) reactions. In the relief of these symptoms, the method hereof serves to inhibit the effects of the allergic reaction when administered in an effective amount. While not intending to be bound by any theoretical mechanism of action, the method hereof is believed to operate by inhibiting the release and/or the action of toxic products, e.g., histamine, 5-hydroxytryptamine, slow releasing substance (SRS-A), and others, which are produced as a result of a combination of specific antibody and antigen (allergic reaction). These properties make the subject compounds particularly useful in the treatment of various allergic conditions.

This aspect of the present invention thus relates to a method useful for inhibiting the effects of the allergic reaction which comprises administering an effective amount of a compound selected from those represented above (A, B and C) and the pharmaceutically acceptable non-toxic esters, amides, and salts thereof; or a pharmaceutically acceptable non-toxic composition incorporating said acids, esters, amides or salts as an essential ingredient. The present invention, in a third aspect, is directed to pharmaceutical compositions useful for inhibiting the effects of the allergic reaction comprising an effective amount of a compound selected from those represented above (A, B and C) and the pharmaceutically acceptable non-toxic esters, amides and salts thereof; in admixture with a pharmaceutically acceptable non-toxic carrier.

The compounds of the present invention are also smooth muscle relaxants, e.g., bronchial dilators, and are therefore useful in the treatment of conditions in which such agents may be indicated, as for instance, in the treatment of bronchoconstriction. The compounds of the present invention are also vasodilators and are therefore useful in the treatment of conditions in which such agents may be indicated, as for instance, in renal and cardiac disorders.

In the practice of the method of the present invention, an effective amount of compound of the present invention or pharmaceutical compositions thereof, as defined above, is administered via any of the usual and acceptable methods known in the art, either singly or in combination with another compound or compounds of the present invention or other pharmaceutical agents, such as antibiotics, hormonal agents, and so forth. These compounds or compositions can thus be administered topically, parenterally, by inhalation, and preferably orally, in the form of either solid, liquid, or gaseous dosages including tablets, suspensions, and aerosols, as discussed in more detail hereinafter. The administration can be conducted in single unit dosage form with continuous therapy or in single dose therapy ad libitum. In the preferred embodiments, the method of the present invention is practiced when relief of symptoms is specifically required, or, perhaps, imminent; however, the method hereof is also usefully practiced as continuous or prophylactic treatment.

In view of the foregoing as well as in consideration of the degree of severity of the condition being treated, age of subject, and so forth, all of which factors being determinable by routine experimention by one skilled in the art; the effective dosage in accordance herewith can vary over a wide range. Generally, an effective amount ranges from about 0.005 to about 100 mg. per kg. of body weight per day and preferably from about 0.01 to about 100 mg. per kg. of body weight per day. In alternate terms, an effective amount in accordance herewith generally ranges from about 0.5 to about 7,000 mg. per day per subject.

Useful pharmaceutical carriers for the preparation of the compositions hereof can be solids, liquids, or gases. Thus, the compositions can take the form of tablets, pills, capsules, powders, sustained release formulations, solutions, suspensions, elixirs, aerosols, and the like. The carriers can be selected from the various oils including those of petroleum, animal, vegetable, or synthetic origin, for example, peanut oil, soybean oil, mineral oil, sesame oil, and the like. Water, saline, aqueous dextrose, and glycols are preferred liquid carriers, particularly for injectable solutions. Suitable pharmaceutical excipients include starch, cellulose, talc, glucose, lactose, sucrose, gelatin, malt, rice, flour, chalk, silica gel, magnesium carbonate, magnesium stearate, sodium stearate, glyceryl monostearate, sodium chloride, dried skim milk, glycerol, propylene glycol, water, ethanol, and the like. Suitable pharmaceutical carriers and their formulation are described in "Remingtons Pharmaceutical Sciences" by E. W. Martin. Such compositions will, in any event, contain an effective amount of the active compound together with a suitable amount of carrier so as to prepare the proper dosage form for proper administration to the host.

The compounds of the present invention demonstrate activity as inhibitors of the effects of the allergic reaction as measured by tests indicative of such activity involving passive cutaneous anaphylaxis as substantially described, for example, by J. Goose et al., *Immunology*, 16, 749 (1969). The compounds of the present invention demonstrate bronchopulmonary activity as measured by tests indicative of such activity involving the isolated tracheal chain assay as substantially described, for example, by J. C. Castillo et al., *Journal of Pharmacology and Experimental Therapeutics*, Vol. 90, 104 (1947) and the histamine aerosol bronchoconstriction assay as substantially described, for example, by O. H. Siegmund et al., *Journal of Pharmacology and Experimental Therapeutics*, Vol. 90, 254 (1947).

The compounds of the present invention can be prepared in accordance with the following reaction sequence:

The reaction is conducted via known per se Wittig conditions, preferably in an inert organic reaction medium, such as tetrahydrofuran, dimethylsulfoxide, and the like, or suitable mixtures of two or more of such media; at temperatures ranging from about 10° to about 60°C, preferably from about 25° to about 50°C; and for a period of time sufficient to complete the reaction, ranging from about 1 hour to about 6 hours.

The reaction consumes the reactants on the basis of one mole of the Wittig reactant per mole of the formyl xanthone acid ester substrate. However, the amounts of the reactants to be employed are not critical, some of the desired compound (2) being obtained when employing any proportions thereof. In the preferred embodiments, the reaction is conducted by reacting from about 1.2 to about 1.5 moles of the Wittig reactant per mole of xanthone acid ester. The inert organic reaction medium, if employed, is used in solvent amounts.

Thereafter, the prepared compound (2) is base hydrolyzed, if desired, to give the corresponding alkenyl substituted xanthone-2-carboxylic acid products hereof (3). The base hydrolysis conditions can be any employed conventionally in the art. Generally, the hydrolysis reaction is conducted using an alkali metal hydroxide at about 50° to about 90°C and for a period of time sufficient to complete the reaction, ranging from about 15 minutes to about 60 minutes, preferably in the presence of inert organic reaction media, such as those normally employed in organic chemical reactions of this type, e.g., aqueous alkanol solutions. Although one mole of base is required per mole of compound (2), the amounts employed are not critical to produce the de-

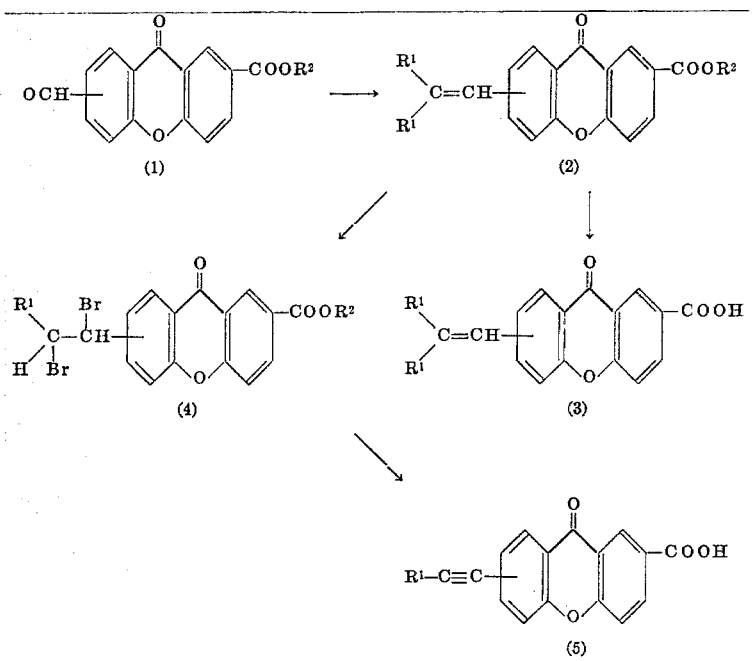

wherein each $R^1$ is as above defined; $R^2$ is lower alkyl, preferably methyl; the OCH—, $(R^1)_2C=CH$—, $R^1BrHC\text{-}CHBr$—, and $R^1C\equiv C$— groups being attached at the C-5, 6 or 7 ring positions.

With reference to the above reactions sequence, a C-5, 6, or 7 formyl substituted xanthone-2carboxylic acid ester is alkylated with an appropriate alkylene Wittig reagent, such as methylene triphenylphosphorane, ethylene triphenylphosphorane, isopropylene triphenylphosphorane, and so forth, to provide the xanthone acid ester product (2).

sired hydrolysis. Preferably from about 1.2 to about 1.5 moles of base are employed per mole of compound (2) and the reaction medium, if employed, is used in solvent amounts.

Those compounds of Formula (2) wherein at least one $R^1$ group is hydrogen can also be dibrominated to give the corresponding dibromo intermediate of Formula (4). This reaction is conducted using a slight excess of bromine in chloroform at temperatures ranging from about 10° to about 50°C, preferably from about 20° to about 30°C, and for a period of time sufficient to complete the reaction, ranging from about 1 hour to about 4 hours.

Thereafter, the product compounds of Formula (4) are base hydrolyzed to give the corresponding alkynylxanthone-2-carboxylic acid products hereof (5). This reaction is conducted with a suitable base, such as an alkali metal hydroxide at about 50° to about 90°C and for a period of time sufficient to complete the reaction, ranging from about 15 minutes to about 60 minutes, preferably in the presence of inert organic reaction media, such as those normally employed in organic chemical reactions of this type, e.g., aqueous alkanol solutions. Although three moles of base is required per mole of compound (2), the amounts employed are not critical to produce the desired hydrolysis. Preferably from about 3.5 to about 5 moles of base are employed per mole of compound (2) and the reaction medium, if employed, is used in solvent amounts.

The starting compounds (1) are prepared as follows. Phenol is condensed with a 1,3-dicarbo-(lower)alkoxy-4-halobenzene compound in the presence of cuprous oxide optionally in organic liquid reaction medium, preferably an organic amide to prepare the corresponding 1,3-dicarbo(lower)alkoxy-4-phenyloxybenzene compound.

The prepared compound is base hydrolyzed using an alkali metal hydroxide about 50° to about 90°C and for a period of time sufficient to complete the reaction, ranging from about 15 minutes to about 60 minutes, to give the corresponding 1,3-dicarboxy-4-phenyloxybenzene. The thus-prepared diacid compound is then cyclized with phosphoryl chloride, sulfuric acid, hydrogen fluoride, or preferably, polyphosphoric acid (PPA), preferably, but optionally, conducted in an inert organic reaction medium including those usually employed in organic chemical reactions, such as dimethylsulfoxide, sulfolane, benzene, toluene, and so forth. The reaction is further conducted at temperatures ranging from about 60° to about 180°C, and for a period of time sufficient to complete the reaction ranging from about 15 minutes to about 90 minutes, to give the corresponding xanthone-2-carboxylic acid.

The xanthone-2-carboxylic acid compound is reduced such as with potassium hydroxide in hydrazine, zinc and potassium hydroxide in ethanol, and like reduction methods to prepare the corresponding xanthene-2-carboxylic acid. This compound is conventionally esterified by means known to those skilled in the art, for example, by treatment of the acid with diazoalkane or with alkanol and sulfuric acid. The resultant xanthene-2-carboxylic acid ester is reacted with chloroacetyl chloride under Friedel-Crafts conditions to give the corresponding 7-chloroacetyl compound which is then oxidized, as under Jones conditions, to give the corresponding xanthone compound which is reduced as with sodium borohydride to give the 7-(2-chloro-1-hydroxyethyl)-xanthone-2-carboxylate compound. The resultant compound is treated with sodium hydride in dimethylformamide to give the 7-(1,2-oxidoethyl)- compound and this treated with periodic acid or with perchloric acid and sodium periodate to give the 7-formylxanthone-2-carboxylate ester.

Alternatively, 5- or 7-methylxanthone-2-carboxylic acids are prepared by employing o- and p-methylphenol, respectively, and these compounds converted to the respective acid esters. The esters are then oxidized with concentrated sulfuric acid and chromic acid in acetic acid/anhydride to afford the 5- and 7-formylxanthone-2-carboxylic and acid esters. Similarly, 6-formylxanthone-2-carboxylic acid esters are prepared employing initially, m-methylphenol.

The acid esters of the xanthone-2-carboxylic acids hereof are prepared upon treatment of the acid with ethereal diazoalkane, such as diazomethane and diazoethane, or with the desired lower alkyl iodide in the presence of lithium carbonate at room temperature or with the desired lower alkanol in the presence of a trace of sulfuric acid at reflux. The glycerol esters are prepared by treating the acid with thionyl chloride followed by treatment with a suitably protected ethylene glycol or propylene glycol (e.g., solketal) in pyridine, and hydrolyzing the protecting group of the ester thus formed with dilute acid.

The amides of the xanthone-2-carboxylic acids hereof are prepared by treatment of the acids with thionyl chloride followed by treatment with anhydrous ammonia, alkylamine, dialkylamine, dialkylaminoalkylamine, alkoxyalkylamine, or phenethylamine.

The salts of the xanthone-2-carboxylic acids hereof are prepared by treating the corresponding acids with pharmaceutically acceptable base. Representative salts derived from such pharmaceutically acceptable bases are sodium, potassium, lithium, ammonia, calcium, magnesium, ferrous, ferric, zinc, manganous, aluminum, manganic, the salts of trimethylamine, triethylamine, tripropylamine, β-(dimethylamino)ethanol, triethanolamine, β-(diethylamino)ethanol, arginine, lysine, histidine, N-ethylpiperidine, hydrabamine, choline, betaine, ethylenediamine, glucosamine, methyl glucamine, theobromine, purines, piperazine, piperidine, polyamine resins, caffeine, procaine, or the like. The reaction is conducted in an aqueous solution, alone or in combination with an inert, water miscible organic solvent, at a temperature of from about 0° to about 100°C, preferably at room temperature. Typical inert, water miscible organic solvents include methanol, ethanol, isopropanol, butanol, acetone, dioxane, or tetrahydrofuran. When divalent metal salts are prepared, such as the calcium salts or magnesium salts of the acids, the free acid starting material is treated with about one-third molar equivalent of pharmaceutically acceptable base. When the aluminum salts of the acids are prepared, about one-third molar equivalent of the pharmaceutically acceptable base is employed.

In the preferred embodiment of the present invention, the calcium salts and magnesium salts of the acids are prepared by treating the corresponding sodium or potassium salts of the acids with at least one molar equivalent of calcium chloride or magnesium chloride, respectively, in an aqueous solution, alone or in combination with an inert water miscible organic solvent, at a temperature of from about 20° to about 100°C.

In a preferred embodiment of the present invention, the aluminum salts of the acids are prepared by treating the acids with at least one molar equivalent of an aluminum alkoxide, such as aluminum triethoxide, aluminum tripropoxide, and the like, in a hydrocarbon solvent, such as benzene, xylene, cyclohexane, and the like, at a temperature of from about 20° to about 115°C.

By the term "pharmaceutically acceptable, non-toxic esters, amides, and salts" is respectively intended an alkyl or glycerol ester; an unsubstitued monoalkyl, dialkyl, dialkylaminoalkyl, alkoxyalkyl, or phenethyl substuted amide; and a salt as defined above.

The described 1,3dicarbalkoxy-4-halobenzene compounds are conveniently prepared by oxidizing 1,3-dimethyl-4-halobenzene (4-halo-m-xylene) with potassium permanganate in aqueous t-butanol followed by conventional exterification.

The starting alkylene Wittig reagents are prepared by treatment of the corresponding alkyl triphenylphosphonium bromide (prepared by reaction of triphenylphosphine with alkyl bromide) with a strong base, e.g., sodium hydroxide or n-butyl lithium. This can be done with reaction of the product Wittig reagent with the formyl xanthone substrate in situ. In this reaction, therefore, "alkyl" is methyl, ethyl, n-propyl, isopropyl, sec-butyl, and 3-pentyl.

The following examples illustrate the method by which the present invention can be practiced.

PREPARATION 1

A mixture of 4.188 g. of 1,3-dicarbomethoxy-4-bromobenzene, 2.85 g. of phenol, 1.32 g. of cuprous oxide in 20 ml. of dimethylacetamide is heated to 160°C and maintained thereat with stirring and under a nitrogen atmosphere. After monitoring via tlc indicates the reaction is substantially complete, the reaction mixture is diluted with water and extracted with diethylether: methylene chloride (3:1). The extracts are chromatographed on 150 g. of alumina and the uniform fractions combined to give 1,3-dicarbomethoxy-4-phenyloxybenzene.

1,3-Dicarbomethoxy-4-phenyloxybenzene (3 g.) is combined with 150 ml. of 5 percent potassium hydroxide in methanol. The resultant mixture is refluxed for one hour after which time it is acidified, cooled, and filtered, to give 1,3-dicarboxy-4-phenyloxybenzene.

Two grams of 1,3-dicarboxy-4-phenyloxybenzene in 20 ml. of concentrated sulfuric acid is stirred at 80°C for 1 hour. After this time, the reaction mixture is poured into 200 ml. of ice water and the resultant mixture is heated on a steam bath for 15 minutes. The mixture is cooled and filtered with the precipitate being washed with water and then recrystallized from acetic acid to give xanthone-2-carboxylic acid.

Likewise prepared are 5-methylxanthone-2-carboxylic acid, 6-methylxanthone-2-carboxylic acid, and 7-methylxanthone-2-carboxylic acid by use of o-methylphenol, m-methylphenol, and p-methylphenol, respectively, in lieu of phenol in paragraph one. The methyl esters thereof are prepared as described in Preparation 5.

PREPARATION 2

To a solution of 25 g. of xanthone-2-carboxylic acid in 200 ml. of triethylene glycol are added 18 g. of potassium hydroxide and 12.1 g. of 95 percent hydrazine. The resultant mixture is heated to reflux (155°C) and maintained thereat for one hour. The distillate is removed and the temperature is held at about 200°C for 2 hours. The mixture is then cooled to 68°C and 200 ml. of water is added and the resultant solution poured into 110 ml. of water containing 60 ml. of concentrated hydrochloric acid. The resultant mixture is heated to 90°C, cooled to room temperature and filtered to give xanthene-2-carboxylic acid.

26 grams of xanthene-2-carboxylic acid is added to 400 ml. of absolute methanol. To the resultant solution are added 18 ml. of concentrated sulfuric acid and the mixture is then heated at reflux for about two hours. The mixture is then cooled to 40°C and sufficient water is added to bring the total volume to 1,400 ml. The resultant mixture is then filtered to give methyl xanthene-2-carboxylate.

PREPARATION 3

A mixture of methyl xanthene-2-carboxylate (5.1 g.), 7.0 g. of aluminum chloride, 3 g. of chloroacetyl chloride, and 100 ml. of dichloroethane is stirred at room temperature for four hours. After the addition of hydrochloric acid-ice followed by chloroform extraction, the mixture is filtered through alumina ($CH_2Cl_2$), and evaporated to give methyl 7-chloroacetylxanthene-2-carboxylate.

To a solution of 1.42 g. of methyl 7-chloroacetylxanthene-2-carboxylate in 120ml. of acetone and 15 ml. of dimethylformamide are added 3.0 g. of magnesium sulfate and 2.5 ml. of 8N chromic acid in 8N sulfuric acid. The resultant mixture is stirred at room temperature for 50 minutes after which time a solution of 4 g. of sodium bisulfite in 20 ml. of water is added. After this time, 250 ml. of water and 25 ml. of sulfuric acid: water (1:1) are added. The mixture is stripped of solvent and filtered. The precipitate is washed with 50 ml. of water to give methyl 7-chloroacetylxanthone-2-carboxylate which is recrystalized from methanol (displacement from methylene chloride solution).

A mixture of 750 mg. of methyl 7-chloroacetylxanthone-2-carboxylate, 200 mg. of sodium borohydride, and 75 ml. of tetrahydrofuran is stirred for one hour at room temperature. Tlc ($CH_2Cl_2$/AcOEt 9:1) indicates the reaction is complete. Excess sodium borohydride is destroyed by the dropwise addition of aqueous acetic acid (5%). The mixture is concentrated in vacuo and extracted with ethyl acetate to give methyl 7-(1-hydroxy-2-chloroethyl)-xanthone-2-carboxylate.

A mixture of 750 mg. of methyl 7-(1-hydroxy-2-chloroethyl)-xanthone-2-carboxylate, 150 mg. of sodium hydride, 75 ml. of dimethylformamide is stirred for three hours at room temperature. Excess sodium hydride is destroyed by adding a few drops of acetic acid. The mixture is then diluted with water, extracted with ethyl acetate and chromatographic on 75 g. of silica ($CH_2Cl_2$/AcOEt; 9:1) to give methyl 7-(1,2-oxidoethyl)-xanthone-2-carboxylate.

A mixture of 118 mg. of methyl 7-(1,2-oxidoethyl)-xanthone-2-carboxylate, 100 mg. of periodic acid, and 15 ml. of tetrahydrofuran is stirred at room temperature for two hours. After this time, 15 ml. of methylene chloride is added, the mixture filtered through alumina ($CH_2Cl_2$), and evaporated. The residue is crystallized from methylene chloride:methanol to give methyl 7-formylxanthone-2-carboxylate.

PREPARATION 4

Methyl 5-methylxanthone-2-carboxylate is prepared by the procedure of Preparation 1, followed by the preparation of the methyl ester of the thus-produced acid.

To a solution of 2.4 g. of methyl 5-methylxanthone-2carboxylate in 30 ml. acetic acid and 30 ml. acetic anhydride are added 4.8 ml. concentrated sulfuric acid at 0°C. After the addition of 5.6 g. of chromic acid, the mixture is stirred for five hours. The crude diacetoxymethyl intermediate is isolated by diluting the reaction mixture with water and filtering off the precipitate. The formyl derivative is obtained by refluxing the diacetoxymethyl compound thus obtained with 10 ml. 2N sulfuric acid in 90 ml. methanol for 30 minutes, cooling, diluting with 60 ml. water and filtering off the precipitate to give 5-formylxanthone-2-carboxylic acid.

6-Formylxanthone-2-carboxylic acid is also thus prepared.

7-Formylxanthone-2-carboxylic acid is prepared by the above procedure, preferably by using 30 ml. of 2N sulfuric acid in 70 ml. of ethanol for two hour treatment of the diacetate.

PREPARATION 5

A mixture of 4 g. of 7-formylxanthone-2-carboxylic acid, 10 g. of methyl iodide, and 10 g. of lithium carbonate in 50 ml. of dimethylformamide is stirred at room temperature for a period of 16 hours. After this period of time, the reaction mixture is poured into dilute hydrochloric acid-ice and the resultant mixture extracted with ethyl acetate. The extracts are filtered through alumina to give methyl 7-formylxanthone-2-carboxylate which can be recrystallized from methanol.

Similarly methyl 5-formylxanthone-2-carboxylate and methyl 6-formylxanthone-2-carboxylate are prepared.

EXAMPLE 1

Sodium hydride (420 mg.) (57 percent oil dispersion) is added to 90 ml. of anhydrous dimethylsulfoxide and the resulting suspension is stirred at room temperature and under nitrogen for 20 minutes. After this period of time, 3.9 g. of methyl-triphenylphosphonium bromide are added to the reaction mixture and stirring is continued for 2 hours. A solution of 2.82 g. methyl 7-formylxanthone-2-carboxylate in 30 ml. of dimethylsulfoxide is then added. After stirring for another 2 hours, the mixture is diluted with 1.2 l. of water and extracted with chloroform. The extracts after chromatography on silica, yield methyl 7-vinylxanthone-2-carboxylate.

The product compound of the above procedure is hydrolyzed as described in Preparation 1, paragraph 2 to give 7-vinylxanthone-2-carboxylic acid.

EXAMPLE 2

The procedures of Example 1 are repeated using the reagents listed in Column A below in lieu of methyl triphenylphosphonium bromide to give the respective products listed in Column B below, through their respective methyl esters.

| Column A | Column B |
| --- | --- |
| ethyl triphenylphosphonium bromide | 7-(2-methylvinyl)-xanthone-2-carboxylic acid [7-(prop-1-en-1-yl)-xanthone-2-carboxylic acid] |
| n-propyl triphenylphosphonium bromide | 7-(2-ethylvinyl)-xanthone-2-carboxylic acid |
| isopropyl triphenylphosphonium bromide | 7-(2,2-dimethylvinyl)-xanthone-2-carboxylic acid |
| sec-butyl triphenylphosphonium bromide | 7-(2-methyl-2-ethylvinyl)-xanthone-2-carboxylic acid |
| 3-pentyl triphenylphosphonium bromide | 7-(2,2-diethylvinyl)-xanthone-2-carboxylic acid |

EXAMPLE 3

The procedures of Examples 1 and 2 are repeated using each of methyl 5-formylxanthone-2-carboxylate and methyl 6-formylxanthone 2-carboxylate as substrates to produce the corresponding 5- and 6-substituted xanthone-2-carboxylic acid products, through their respective methyl esters, i.e., 5-vinylxanthone-2-carboxylic acid,
6-vinylxanthone-2-carboxylic acid,
5-(2-methylvinyl)-xanthone-2-carboxylic acid;
6-(2-methylvinyl)-xanthone-2-carboxylic acid,
5-(2-ethylvinyl)-xanthone-2-carboxylic acid,
6-(2-ethylvinyl)-xanthone-2-carboxylic acid,
5-(2,2-dimethylvinyl)-xanthone-2-carboxylic acid,
6-(2,2-dimethylvinyl)-xanthone-2-carboxylic acid,
5-(2-methyl-2-ethylvinyl)-xanthone-2-carboxylic acid,
6-(2-methyl-2-ethylvinyl)-xanthone-2-carboxylic acid,
5-(2,2-diethylvinyl)-xanthone-2-carboxylic acid, and
6-(2,2-diethylvinyl)-xanthone-2-carboxylic acid.

EXAMPLE 4

To a stirred solution of 1.2 g. of methyl 7-vinylxanthone-2-carboxylate in 35 ml. of chloroform is added a solution of 0.3 ml. of bromine in 10 ml. of chloroform. The solution is stirred for two hours, washed with aqueous sodium sulfite, aqueous sodium bicarbonate, and water. After drying over magnesium sulfate, the solvent is evaporated and the residue recrystallized from chloroform/ethanol to give methyl 7-(1,2-dibromoethyl)-xanthone-2-carboxylate.

The product compound of the above procedure is hydrolyzed as described in Preparation 1, paragraph two, using at least three equivalents of base, to give 7-ethynyl-xanthone-2-carboxylic acid.

EXAMPLE 5

The procedures of Example 4 are repeated using each of methyl 7-(2-methylvinyl)-xanthone-2-carboxylate and methyl 7-(2-ethylvinyl)-xanthone-2-carboxylate in lieu of methyl 7-vinylxanthone-2-carboxylate to give the respective 7-(2-methylethynyl)-xanthone-2-carboxylic acid [7-(prop-1-yn-1-yl)-xanthone-2-carboxylic acid] and 7-(2-ethylethynyl)-xanthone-2-carboxylic acid products, through their respective methyl esters.

EXAMPLE 6

The procedures of Examples 4 and 5 are repeated using each of methyl 5-vinylxanthone-2-carboxylate, methyl 6-vinylxanthone-2-carboxylate, methyl 5-(2-methylvinyl)-vinylxanthone-2-carboxylate, methyl 6-(2-methylvinyl)-vinylxanthone-2-carboxylate, methyl 5-(2-ethylvinyl)-vinylxanthone-2-carboxylate, and methyl 6-(2-ethylvinyl)-vinylxanthone-2-carboxylate as substrates to produce the corresponding 5- and 6-substituted xanthone-2-carboxylic acid products, through their respective methyl esters, i.e., 5-ethynylxanthone-2-carboxylic acid,
6-ethynylxanthone-2-carboxylic acid,
5-(2-methylethynyl)-xanthone-2-carboxylic acid,
6-(2-methylethynyl)-xanthone-2-carboxylic acid,
5-(2-ethylethynyl)-xanthone-2-carboxylic acid, and
6-(2-ethylethynyl)-xanthone-2-carboxylic acid.

EXAMPLE 7

A mixture of 4.5 g. of 7-vinylxanthone-2-carboxylic acid, 10 g. of methyl iodide, and 10 g. of lithium carbonate in 75 ml. of dimethylformamide is stirred at room temperature for a period of 18 hours. After this period of time, the reaction mixture is poured into dilute hydrochloric acid-ice and the resultant precipitate is filtered off and washed to give methyl 7-vinylxanthone-2-carboxylate.

The foregoing procedure is repeated using the alternate lower alkyl iodides so as to prepare the corresponding lower alkyl acid esters hereof, e.g.:

ethyl 7-vinylxanthone-2-carboxylate,
n-propyl 7-vinylxanthone-2-carboxylate,
isopropyl 7-vinylxanthone-2-carboxylate,
n-propyl 7-vinylxanthone-2-carboxylate,
isobutyl 7-vinylxanthone-2-carboxylate,
sec-butyl 7-vinylxanthone-2-carboxylate,
n-pentyl 7-vinylxanthone-2-carboxylate, and so forth.

In like manner, the other xanthone-2-carboxylic acids thereof containing substituents at the C-5, 6 or 7 position, prepared as described above, can be converted to the corresponding acid esters, e.g., methyl 7-ethynylxanthone-2-carboxylate, ethyl 7-(2-methylvinyl)-xanthone-2-carboxylate.

EXAMPLE 8

To a solution of 10 g. of 7-vinylxanthone-2-carboxylic acid in 200 ml. of ethanol is added the theoretical amount of sodium hydroxide dissolved in 200 ml. of 90 percent ethanol. The reaction mixture is then concentrated in vacuum to give sodium 7-vinylxanthone-2-carboxylate.

Sodium 7-ethynylxanthone-2-carboxylic acid is also thus prepared.

In a similar manner, the potassium and lithium salts are prepared. Similarly, by replacing the sodium salt by means of an appropriate metal salt reagent, e.g., calcium chloride, manganese chloride, and so forth, the other xanthone-2-carboxylic acid salts are prepared, e.g.:

magnesium 7-vinylxanthone-2-carboxylate,
calcium 7-vinylxanthone-2-carboxylate,
aluminum 7-vinylxanthone-2-carboxylate,
ferrous 7-vinylxanthone-2-carboxylate,
zinc 7-vinylxanthone-2-carboxylate,
manganese 7-vinylxanthone-2-carboxylate,
ferric 7-vinylxanthone-2-carboxylate, and so forth.

In a similar manner, the xanthone-2-carboxylic acid salts of the other C-5, 6 or 7 substituted xanthone-2-carboxylic acids hereof are prepared.

EXAMPLE 9

To a mixture of 50 ml. of concentrated aqueous ammonia in 500 ml. of methanol there are added 20 g. of 7-ethynylxanthone-2-carboxylic acid. The resultant mixture is stirred for 2 hours and is then evaporated to dryness to give the ammonium salt of 7-ethynylxanthone-2-carboxylic acid.

A solution of 10 g. of 7-(2-methylvinyl)-xanthone-2-carboxylic acid in 50 ml. of thionyl chloride is heated at reflux for one hour. Thereafter, the solution is evaporated to dryness to give the corresponding acid chloride to which is added a concentrated ethereal ammonia solution. The resultant solution is evaporated giving the ammonium salt of 7-(2-methylvinyl)-xanthone-2-carboxylic acid.

In like manner, the lower alkyl amides can be prepared using monoalkylamine or dialkylamine in lieu of ammonia in the above procedures. Thus prepared, e.g., are:

7-(2-methylethynyl)-xanthone-2-carboxylic acid amide,
N-methyl 6-(2,2-dimethylvinyl)-xanthone-2-carboxylic acid amide,
N,N-dimethyl 5-(2-methylvinyl)-xanthone-2-carboxylic acid amide,
N,N-diethyl 7-(2-ethylethynyl)-xanthone-2-carboxylic acid amide,
N-ethyl 7-(2-methylvinyl)-xanthone-2-carboxylic acid,
N-n-propyl 5-(2-methylethynyl)-xanthone-2-carboxylic acid amide, and so forth.

EXAMPLE 10

To a mixture of 20 g. of procaine and 500 ml. of aqueous methanol are added 20 g. of 7-(2-methylvinyl)-xanthone-2-carboxylic acid. The resultant mixture is stirred at room temperature for 16 hours. It is then evaporated under reduced pressure, to give the procaine salt of 7-(2-methylvinyl)-xanthone-2-carboxylic acid.

Similarly, the lysine, caffeine, and arginine salts thereof are obtained. In like manner, the e.g. procaine, lysine, caffeine, and arginine salts of the other 5, 6, or 7-substituted xanthone-2-carboxylic acids are obtained, e.g.:

the procaine salt of 7-(2-ethylvinyl)-xanthone-2-carboxylic acid,
the caffeine salt of 6-(2,2-dimethylvinyl)-xanthone-2-carboxylic acid,
The lysine salt of 5-(ethylethynyl)-xanthone-2-carboxylic acid,
the procaine salt of 7-(2-methylethynyl)-methylxanthone-2-carboxylic acid, and
the arginine salt of 5-(vinyl)-xanthone-2-carboxylic acid.

EXAMPLE 11

The following illustrate the method by which the pharmaceutical compositions of the compounds hereof are prepared.

Sodium chloride (0.44 g.) is dissolved in 80 ml. of a (9.47 g/l water) sodium hydrogen phosphate solution. A sodium dihydrogen phosphate (8.00 g/l water) solution (20 ml.) is then added thereto. The resultant solution having a pH of 7.38 is sterilized in an autoclave. This vehicle is then added to solid, dry sodium 7-vinylxanthone-2-carboxylate to give a preparation suitable for intravenous injection containing 2.5 mg. of sodium 7-vinylxanthone-2-carboxylate per ml. of total composition.

7-Ethynylxanthone-2-carboxylic acid is dissolved in a vehicle having a composition ranging from propylene glycol:water of 50:50 (w/w) to give an aerosol preparation suitable for inhalation.

Sodium 7-(2-methylvinyl)-xanthone-2-carboxylic acid (1 part) is mixed with from 1 to 10 parts (by weight) of lactose or urea to give a powder preparation suitable for administration by nebulization.

Tablet preparations suitable for oral administration are prepared by mixing the following ingredients in the indicated proportions:

| Component | Percent. by Weight |
|---|---|
| a xanthone-2-carboxylic acid compound hereof | 0.5 – 70 |
| polyvinylpyrrolidone | 0.5 – 10 |
| starch | 10 – 25 |
| lactose | 20 – 75 |
| magnesium stearate | 0.1 – 1 |
| granulating fluids (e.g., aqueous methanol, water, chloroform) | |

EXAMPLE 12

Illustrative test procedures for the compounds hereof are as follows:

Normal female (Sprague-Dawley) rats of 140 to 160 grams each are passively sensitized intradermally by injection of rat anti-egg albumin reaginic sera. After 24 hours, each rat is challenged intravenously with 1.75 ml. of 0.4 percent Evans blue, 1 mg. egg albumin plus 0.25 mg. of 7-vinylxanthone-2-carboxylic acid. Control rats receive no 7-vinylxanthone-2-carboxylic acid. The dermal bluing is recorded 15 to 25 minutes later. The rats which receive the 7-vinylxanthone-2-carboxylic acid exhibit a 100 percent inhibition of allergic reaction whereas the control rats exhibit no inhibition.

The above procedure is repeated using 7-ethynylxanthone-2-carboxylic acid, with similar results. The above procedure is repeated using oral administration, with similar results.

EXAMPLE 13

A dosage of 100 mg. per kg. of body weight of 7-vinylxanthone-2-carboxylic acid is given intraperitoneally to guinea pigs. Other pigs are left untreated to serve as controls. After treatment, the treated pigs and the controls are exposed to an aqueous spray of 0.05 percent histamine diphosphate (calc. as base), delivered by a nebulizer, until they exhibit a loss of righting ability. During exposure they are observed for severity of reaction. This ranges from slightly deeper breathing to deep breathing to preconvulsive gasping and ataxia to collapse. The pigs which receive the 7-vinylxanthone-2-carboxylic acid exhibit a significant resistance to the histamine aerosol challenge, whereas all control pigs collapse within the exposure time.

The above procedure is repeated using 7-ethynylxanthone-2-carboxylic acid with similar results.

EXAMPLE 14

The trachea of a recently sacrificed guinea pig is removed by dissection and cut between the segments of cartilege into rings containing tracheal muscle which are tied to form a 180° alternating smooth muscle tracheal chain. The thus-produced continuous length of smooth muscle is mounted in a tissue bath maintained at 37°C with the upper end attached to a linear motion transducer which in turn is connected to a recorder. The responses of a standard, aminophylline, and 7-vinylxanthone-2-carboxylic acid are compared after introducing each separately into the bath in various amounts or concentrations. The results show a significant relaxation of the tracheal chain with the test compound.

Inhibition of reaginic antigen-antibody reactions in rats is regarded as representative of inhibition of human reaginic antigen-antibody reactions which occur during allergic episodes. Protection against histamine aerosol induced bronchoconstriction and relaxation of isolated tracheal chain is regarded as representative of human bronchopulmonary activity including bronchodilator activity. Subjects suffering from bronchopulmonary disorders are studied as to severity of bronchospasm and changes in severity by observable and measurable changes in expiratory function. Such measurements include quantitation of expiratory pulmonary air flow, measurable by such instruments as a peak flow meter, and comparison of pulmonary volumes before and after treatment with the subject compounds hereof, as measured by spirometric and/or plethysmographic methods. Subjective relief of the symptoms upon administration of the compounds hereof is evidence by improvements in dyspnea, wheezing, cough and expectorated sputum.

What is claimed is:

1. A compound selected from those represented by the following formulas:

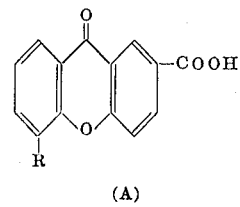

(A)

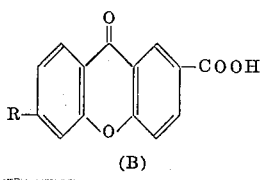 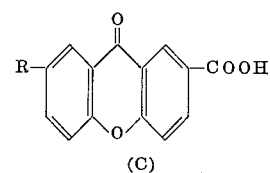

(B)                    (C)

and the pharmaceutically acceptable, non-toxic esters, amides and salts thereof, wherein each R is a group selected from those of the formulas:

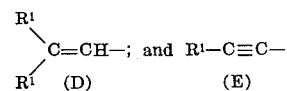

(D)            (E)

in which each $R^1$ is hydrogen, methyl, or ethyl.

2. A compound according to claim 1 of Formula (A).

3. A compound according to claim 2 wherein R is a group of Formula (D).

4. A compound according to claim 3 wherein each $R^1$ is hydrogen.

5. A compound according to claim 2 wherein R is a group of Formula (E).

6. A compound according to claim 5 wherein $R^1$ is hydrogen.

7. A compound according to claim 1 of Formula (B).

8. A compound according to claim 1 of Formula (C).

9. A compound according to claim 8 wherein R is a group of Formula (D).

10. A compound according to claim 9 wherein each $R^1$ is hydrogen.

11. A compound according to claim 8 wherein R is a group of Formula (E).

12. A compound according to claim 11 wherein $R^1$ is hydrogen.

13. The sodium salt of a compound of claim 1.

14. The sodium salt according to claim 13 of Formula (C).

* * * * *